US012725776B2

(12) United States Patent
Lee et al.

(10) Patent No.: US 12,725,776 B2
(45) Date of Patent: Sep. 1, 2026

(54) NEGATIVE ELECTRODE FOR LITHIUM SECONDARY BATTERIES INCLUDING CURRENT COLLECTOR COATED WITH PRIMER AND METHOD OF MANUFACTURING THE SAME

(71) Applicant: LG Energy Solution, Ltd., Seoul (KR)

(72) Inventors: Jung Pil Lee, Daejeon (KR); Hyun Woong Yun, Daejeon (KR); Sun Woo Hwang, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 764 days.

(21) Appl. No.: 17/641,345

(22) PCT Filed: Apr. 22, 2021

(86) PCT No.: PCT/KR2021/005122

§ 371 (c)(1),
(2) Date: Mar. 8, 2022

(87) PCT Pub. No.: WO2021/221389

PCT Pub. Date: Nov. 4, 2021

(65) Prior Publication Data

US 2022/0399533 A1 Dec. 15, 2022

(30) Foreign Application Priority Data

Apr. 27, 2020 (KR) ........................ 10-2020-0050770

(51) Int. Cl.
*H01M 4/04* (2006.01)
*H01M 4/38* (2006.01)
(Continued)

(52) U.S. Cl.
CPC ......... *H01M 4/0404* (2013.01); *H01M 4/382* (2013.01); *H01M 4/625* (2013.01);
(Continued)

(58) Field of Classification Search
CPC .... H01M 4/0404; H01M 4/382; H01M 4/625; H01M 10/052; H01M 2004/021; H01M 2004/027
See application file for complete search history.

(56) References Cited

U.S. PATENT DOCUMENTS

2005/0191547 A1 9/2005 Konishiike et al.
2008/0057401 A1 3/2008 Mori et al.
(Continued)

FOREIGN PATENT DOCUMENTS

CN 101174685 A 5/2008
CN 105186004 A 12/2015
(Continued)

OTHER PUBLICATIONS

Li et al., "Efficient Lithium Transport and Reversible Lithium Plating in Silicon Anodes: Synergistic Design of Porous Structure and LiF-Rich SEI for Fast Charging", Mar. 5, 2024, Advanced Functional Materials, https://doi.org/10.1002/adfm.202401686 (Year: 2024).*

(Continued)

*Primary Examiner* — Maria Laios
*Assistant Examiner* — Ziheng Lu
(74) *Attorney, Agent, or Firm* — Lerner David LLP

(57) ABSTRACT

Disclosed is a negative electrode for lithium secondary batteries, the negative electrode including a negative electrode current collector, a primer layer applied to the outer surface of the negative electrode current collector, and a lithiophilic material (LPM) formed on at least a portion of the primer layer by coating.

11 Claims, 4 Drawing Sheets

(51) Int. Cl.

| | |
|---|---|
| ***H01M 4/62*** | (2006.01) |
| ***H01M 10/052*** | (2010.01) |
| *H01M 4/02* | (2006.01) |

(52) U.S. Cl.

CPC .... *H01M 10/052* (2013.01); *H01M 2004/021* (2013.01); *H01M 2004/027* (2013.01)

(56) References Cited

U.S. PATENT DOCUMENTS

| | | | | |
|---|---|---|---|---|
| 2013/0017441 | A1 | 1/2013 | Affinito et al. | |
| 2014/0363736 | A1* | 12/2014 | Kim | H01M 4/133 429/223 |
| 2017/0141402 | A1 | 5/2017 | Affinito et al. | |
| 2017/0271678 | A1 | 9/2017 | Yang et al. | |
| 2018/0076451 | A1* | 3/2018 | Kim | H01M 10/0525 |
| 2018/0212333 | A1 | 7/2018 | Kim et al. | |
| 2018/0226633 | A1 | 8/2018 | Fujiki et al. | |
| 2018/0315970 | A1* | 11/2018 | Terashima | H01M 50/417 |
| 2019/0372096 | A1* | 12/2019 | Chae | H01M 10/0525 |
| 2020/0052282 | A1* | 2/2020 | Chae | H01M 4/1393 |
| 2020/0058942 | A1 | 2/2020 | Yun | |
| 2020/0403230 | A1 | 12/2020 | Hong et al. | |
| 2021/0098791 | A1 | 4/2021 | Yoon et al. | |
| 2021/0155484 | A1* | 5/2021 | Zhamu | H01M 4/1395 |
| 2023/0043821 | A1* | 2/2023 | Chen | H01M 4/483 |

FOREIGN PATENT DOCUMENTS

| | | | | | |
|---|---|---|---|---|---|
| CN | 107305942 | A | | 10/2017 | |
| CN | 109728291 | A | | 5/2019 | |
| CN | 110571413 | A | | 12/2019 | |
| CN | 110828829 | A | | 2/2020 | |
| CN | 110875476 | A | | 3/2020 | |
| KR | 100425585 | B1 | | 4/2004 | |
| KR | 20140051251 | A | | 4/2014 | |
| KR | 101744623 | B1 | | 6/2017 | |
| KR | 20170092121 | A | | 8/2017 | |
| KR | 20180087169 | A | * | 8/2018 | H01M 4/0421 |
| KR | 20180091678 | A | | 8/2018 | |
| KR | 20180117483 | A | * | 10/2018 | H01M 4/131 |
| KR | 20190013630 | A | | 2/2019 | |
| KR | 20190057966 | A | | 5/2019 | |
| KR | 20200004755 | A | | 1/2020 | |

OTHER PUBLICATIONS

Search report from International Application No. PCT/KR2021/005122, mailed Jul. 26, 2021.

Zhang N., et al., "Regulating lithium nucleation and growth by zinc modified current collectors." Nano Research, Jan. 1, 2020, vol. 13, No. 1, pp. 45-51.

Zhang, S., et al., "Efficient and stable cycling of lithium metal enabled by a conductive carbon primer layer." Sustainable Energy Fules, published on Sep. 18, 2017, vol. 2, pp. 163-168.

Extended European Search Report including Written Opinion for Application No. 21796570.6 dated Sep. 13, 2024, pp. 1-7.

Li, Xiaoyun, et al., "Improved lithium deposition on silver plated carbon fiber paper", Nano Energy, Sep. 2019, 5 pages, vol. 66.

Zhang, H. et al., "Lithiophilic-lithiophobic gradient interfacial layer for a highly stable lithium metal anode" nature communications, Sep. 2018, pp. 1-45. vol. 9.

Lee, Y.G. et al., "Publisher Correction: High-energy long-cycling all-solid-state lithium metal batteries enabled by silver-carbon composite anodes" nature energy, Amendments, Mar. 2020, pp. 1-29, vol. 5.

Communication pursuant to Article 94(3) EPC for European Application No. 21796570.6, dated Sep. 25, 2025, 4 pages.

* cited by examiner

【FIG. 1】
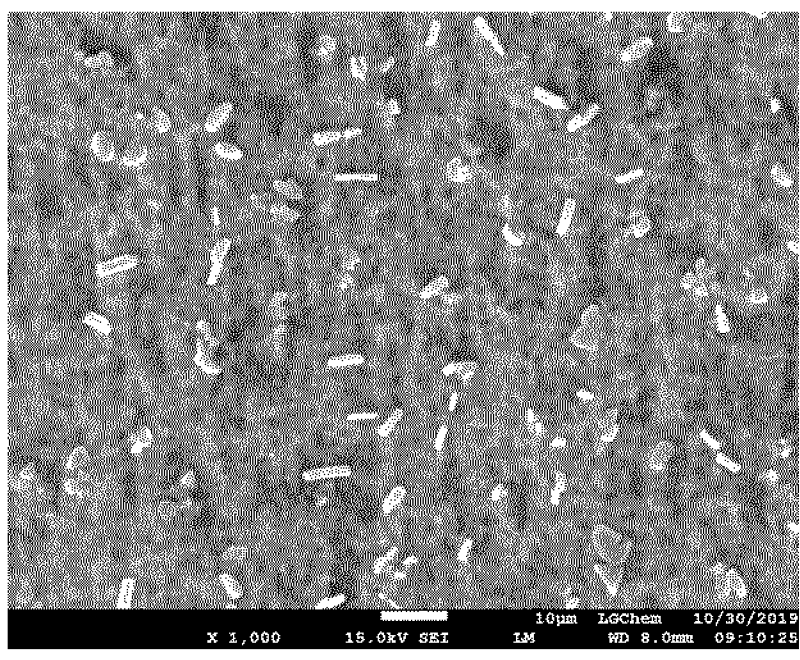
【FIG. 2】
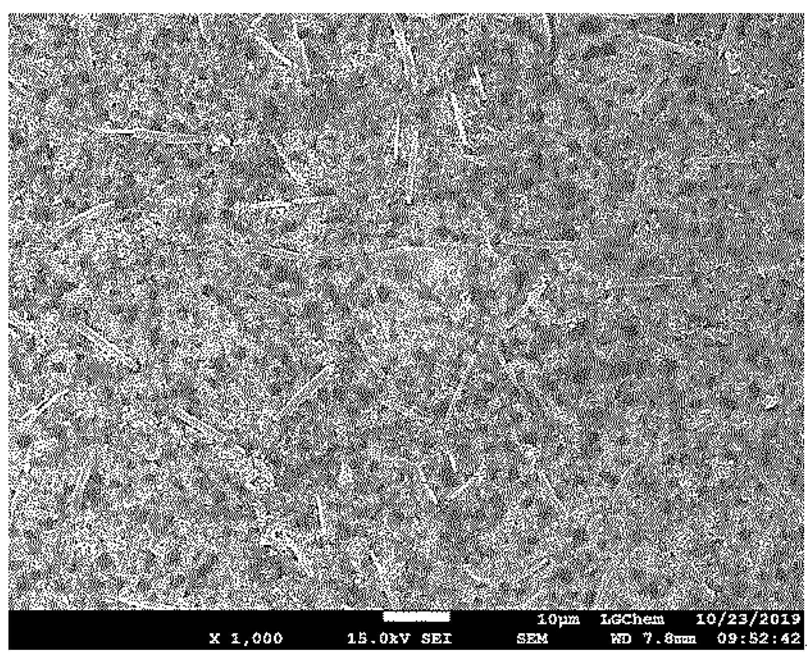

【FIG. 3】
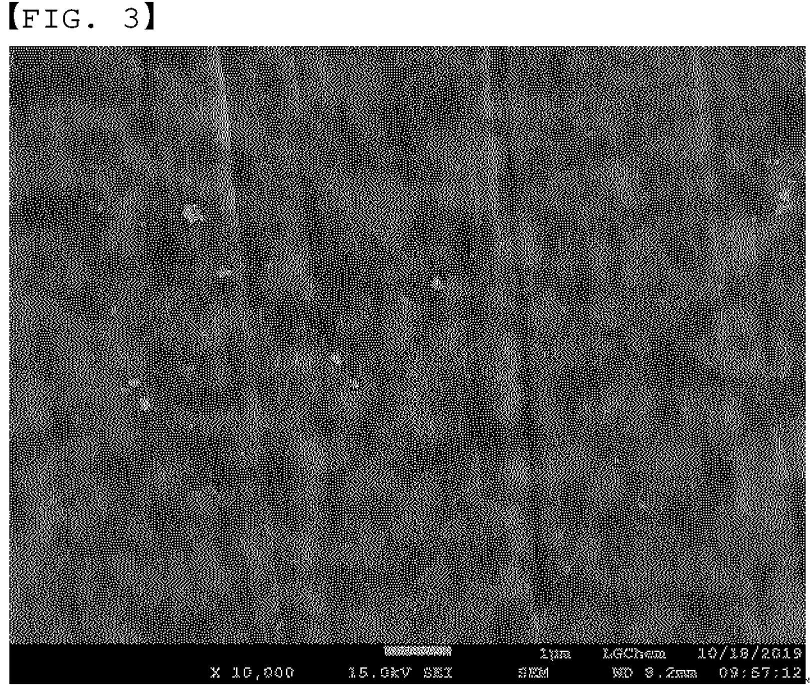
【FIG. 4】

【FIG. 5】
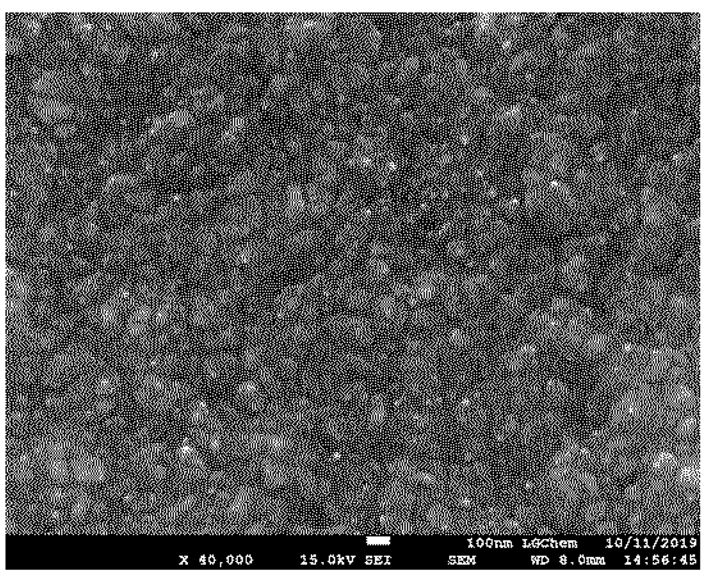
【FIG. 6】
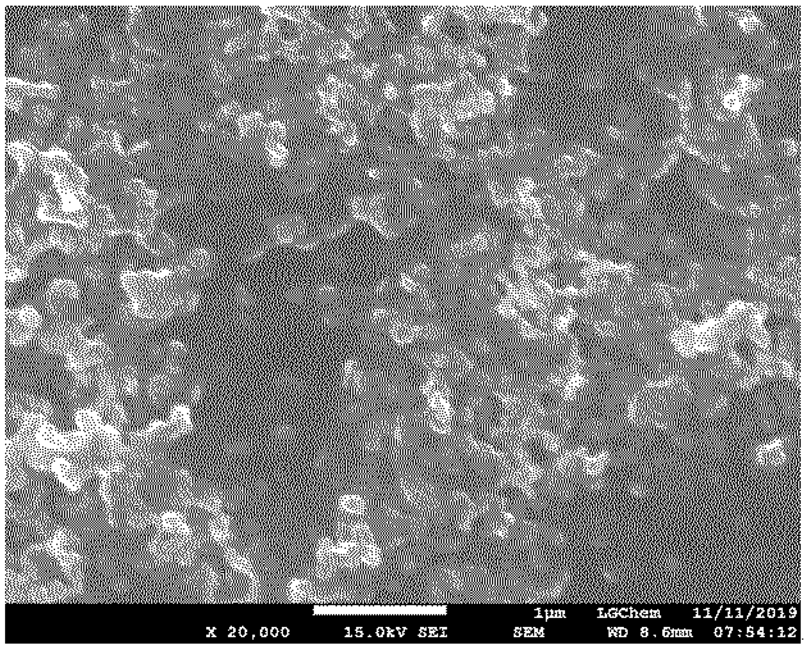

【FIG. 7】
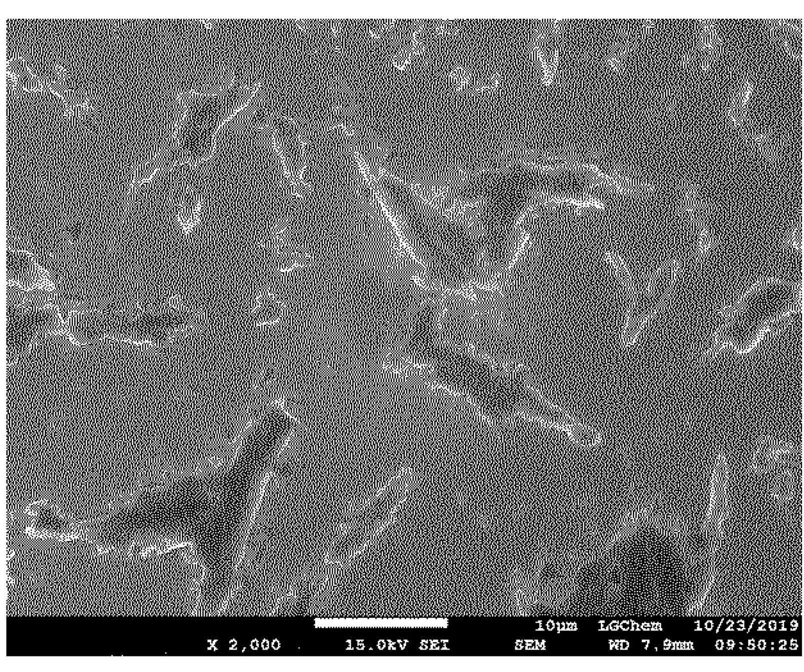

NEGATIVE ELECTRODE FOR LITHIUM SECONDARY BATTERIES INCLUDING CURRENT COLLECTOR COATED WITH PRIMER AND METHOD OF MANUFACTURING THE SAME

CROSS-REFERENCE TO RELATED APPLICATIONS

The present application is a national stage entry under 35 U.S.C. § 371 of International Application No. PCT/KR2021/005122 filed on Apr. 22, 2021, which claims priority from Korean Patent Applications No. 10-2020-0050770 filed on Apr. 27, 2020, all the disclosures of which are incorporated herein by reference.

TECHNICAL FIELD

The present invention relates to a negative electrode for lithium secondary batteries including a current collector coated with a primer and a method of manufacturing the same, and more particularly to a negative electrode for lithium secondary batteries configured such that a lithiophilic material is introduced to the surface of a negative electrode current collector in order to enlarge the portion of the surface of the negative electrode current collector on which lithium plating occurs, whereby it is possible to prevent lithium dendrites from being formed at a specific portion of the negative electrode, and a method of manufacturing the same.

BACKGROUND ART

A lithium secondary battery, which is reusable and has high energy density, has attracted attention as a new energy source that has environmentally friendly characteristics, since the lithium secondary battery not only remarkably reduces the use of fossil fuels but also does not generate by-products as the result of the use of energy.

The lithium secondary battery has been spotlighted as a power source that has high energy density suitable for wearable devices or portable devices and as a high-output power source for electric vehicles. As a result, research on a lithium secondary battery that has high operating voltage and energy density has been more actively conducted.

The operating voltage and energy density of the lithium secondary battery may be changed depending on the kind of an electrode active material, the kind of an electrolytic solution, and the loading amount of an electrode mixture layer. A lithium cobalt oxide composite or a lithium-containing manganese oxide composite is used as a positive electrode active material, and lithium metal, a carbon-based material, or silicon is used as a negative electrode active material. The lithium metal has an advantage of high energy density but has a problem in that, when lithium metal reacts with moisture in air, by-products, such as LiOH, $Li_2O$, and $Li_2CO_3$, are generated.

By-products generated as the result of the lithium metal reacting with the electrolytic solution may considerably deteriorate performance of the battery and may cause internal short circuit.

Furthermore, in the case in which the lithium metal is used as a negative electrode, lithium dendrites are formed on the surface of the lithium metal during charging and discharging of the battery. In the case in which the lithium dendrites grow and penetrate a separator, the lifespan of the lithium secondary battery may be reduced and a fatal problem related to safety may occur. For example, microscopic short circuit may occur.

Patent Document 1 discloses a lithium polymer secondary battery configured such that a cross-linking polymer protective thin film using a diacrylic-based monomer is formed on the surface of lithium metal in order to improve safety of a lithium metal negative electrode, whereby it is possible to improve interface characteristics between the lithium metal electrode and a polymer electrolyte.

Since the protective thin film is easily peeled from the surface of the electrode as the result of driving of the battery, however, it is difficult to sufficiently obtain a lithium dendrite growth prevention effect.

Patent Document 2 discloses an electrode for lithium secondary batteries including an electrode active material layer including lithium metal between a current collector and a protective layer, the protecting layer including a thermally conductive material, wherein heat is uniformly distributed on the surface of the electrode during charging and discharging, whereby lithium dendrites uniformly grow.

Patent Document 2 does not solve a problem in that lithium dendrites grow on the surface of a negative electrode that faces a positive electrode, whereby microscopic short circuit occurs. As described above, the lithium metal negative electrode has still not been applied to the related fields due to growth of lithium dendrites in spite of advantages of high energy density and high voltage

PRIOR ART DOCUMENTS (Patent Document 1) Korean Registered Patent Publication No. 0425585 (2004.03.22)

(Patent Document 2) Korean Patent Application Publication No. 2019-0013630 (2019.02.11)

DISCLOSURE

Technical Problem

The present invention has been made in view of the above problems, and it is an object of the present invention to provide a negative electrode for lithium secondary batteries including a current collector coated with a primer in order to prevent occurrence of short circuit as the result of lithium dendrites that grow on a specific portion of the surface of the negative electrode coming into contact with a positive electrode and a method of manufacturing the same.

Technical Solution

In order to accomplish the above object, a negative electrode for lithium secondary batteries according to the present invention includes a negative electrode current collector, a primer layer applied to the outer surface of the negative electrode current collector, and a lithiophilic material (LPM) formed on at least a portion of the primer layer by coating.

The negative electrode current collector may include a first surface that does not face a separator and a second surface that faces the separator, and the primer layer may be applied to the first surface and/or the second surface of the negative electrode current collector.

Lithium plating (Li plating) may occur on the lithiophilic material.

The primer layer may include carbon.

Only the first surface may be coated with the lithiophilic material.

The lithiophilic material may be at least one of a metal including Au, Ag, Pt, Zn, Si, and Mg and a metal oxide including CuO, ZnO, CoO, and MnO.

In addition, the present invention provides a method of manufacturing the negative electrode. Specifically, the method includes 1) preparing a negative electrode current collector, 2) coating at least one surface of the negative electrode current collector with a primer to form a primer layer, and 3) coating the primer layer of step 2) with a lithiophilic material.

A coating solution of the lithiophilic material may include a metal salt and a reducing agent.

The lithiophilic material coating step may be performed by immersing, spin coating, dip coating, spray coating, doctor blade coating, solution casting, drop coating, physical vapor deposition (PVD), or chemical vapor deposition (CVD).

The content of the metal salt in the coating solution of the lithiophilic material may range from 0.1 weight % to less than 50 weight %.

In addition, the present invention provides an electrode assembly including the negative electrode.

In a concrete example, the negative electrode included in the electrode assembly may be configured such that a first primer layer is applied to a first surface of the negative electrode current collector, a second primer layer is applied to a second surface of the negative electrode current collector, and each of the first primer layer and the second primer layer is coated with a lithiophilic material.

In another concrete example, the negative electrode included in the electrode assembly may be configured such that a first primer layer is applied to a first surface of the negative electrode current collector, a second primer layer is applied to a second surface of the negative electrode current collector, the first primer layer is coated with a lithiophilic material, the second primer layer is coated with no lithiophilic material, and the second primer layer is disposed so as to face a positive electrode in the state in which a separator is interposed therebetween.

In addition, the present invention provides a lithium secondary battery having the electrode assembly received in a battery case together with an electrolytic solution or a solid electrolyte. In addition, the present invention provides a battery module or a battery pack including the lithium secondary battery as a unit cell.

Advantageous Effects

As is apparent from the above description, in a negative electrode for lithium secondary batteries including a current collector coated with a primer according to the present invention and a method of manufacturing the same, the entire surface of a negative electrode current collector is coated with a lithiophilic material in a dispersed state, whereby lithium plating may occur over the entire surface of the negative electrode current collector. Consequently, lithium nucleation potential is lowered and a plurality of lithium nuclei may be formed.

In addition, since the lithiophilic material is widely distributed, a rate at which additional plating occurs on a plurality of lithium nuclei widely dispersed may be increased, compared to a rate at which a lithium nucleus grows on a specific region of the surface of the negative electrode current collector in a vertical direction. Consequently, it is possible to prevent local occurrence of lithium plating on the surface of the negative electrode current collector, thus preventing growth of lithium dendrites.

In addition, on the assumption that the surface of a conventional negative electrode current collector coated with no primer is a smooth 2D surface, a primer layer formed on the negative electrode current collector according to the present invention by coating has a 3D surface, since the primer layer includes a conductive agent and a binder. Since the 3D negative electrode current collector according to the present invention has a larger specific surface area than the 2D negative electrode current collector, the area of contact with an electrolytic solution is increased. Since the size of the interface between the electrolytic solution and the negative electrode current collector is increased, as described above, electrons may move over a larger area, whereby rate properties may be improved.

Consequently, it is possible to prevent growth of lithium dendrites toward a positive electrode, thus preventing short circuit, whereby it is possible to improve lifespan characteristics and safety of a lithium secondary battery.

DESCRIPTION OF DRAWINGS

FIG. 1 is an SEM photograph of a negative electrode manufactured according to Example 1.

FIG. 2 is an SEM photograph of a negative electrode manufactured according to Example 2.

FIG. 3 is an SEM photograph of a negative electrode manufactured according to Example 3.

FIG. 4 is a photograph showing the surface of a negative electrode manufactured according to Comparative Example 1.

FIG. 5 is an SEM photograph of the negative electrode manufactured according to Comparative Example 1.

FIG. 6 is an SEM photograph of a negative electrode manufactured according to Comparative Example 2.

FIG. 7 is an SEM photograph of a negative electrode manufactured according to Comparative Example 3.

BEST MODE

Now, preferred embodiments of the present invention will be described in detail with reference to the accompanying drawings such that the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

A negative electrode for lithium secondary batteries including a current collector coated with a primer according to the present invention may include a negative electrode current collector, a primer layer applied to the outer surface of the negative electrode current collector, and a lithiophilic material (LPM) formed on at least a portion of the primer layer by coating.

Generally, in the case in which lithium metal is used for the negative electrode, the negative electrode has advantages of high energy density and high output. The lithium metal, which is lithium in a metal state, means pure lithium, which is not alloyed with a metal other than lithium. However, the lithium metal may form a lithium nucleus on the surface of the negative electrode, and the lithium nucleus may grow into lithium dendrites. There is a high danger of the lithium dendrites penetrating a separator, whereby internal short circuit may occur.

Consequently, the present invention provides a negative electrode for lithium secondary batteries configured such that a primer layer is formed on the outer surface of a negative electrode current collector and a lithiophilic material is formed on at least a portion of the primer layer by coating, whereby lithium plating occurs over the entire surface of the negative electrode current collector on which the primer layer is formed.

Hereinafter, the negative electrode current collector not only means a negative electrode current collector itself but also includes a configuration in which a primer layer is applied to the outer surface of the negative electrode current collector and a configuration in which a lithiophilic material is formed on the primer layer applied to the negative electrode current collector by coating.

Specifically, the lithiophilic material is a material that has high reactivity with lithium, and lithium plating (Li plating) occurs on the lithiophilic material. In the present invention, therefore, the entire surface of the negative electrode current collector having the primer layer formed thereon is coated with the lithiophilic material in a dispersed state, whereby it is possible to prevent local growth of lithium dendrites.

The negative electrode current collector includes a first surface that does not face a separator and a second surface that faces the separator, wherein the primer layer is applied to the first surface and the second surface of the negative electrode current collector.

A primer layer application method is not particularly restricted, and the same method as a lithiophilic material coating method, a description of which will follow, may be used.

Consequently, the primer layer may be formed on the side surface of the negative electrode current collector in a thickness direction.

The negative electrode current collector according to the present invention has low lithiophilicity; however, lithiophilicity of the negative electrode current collector is improved as the result of the primer layer being formed on the surface thereof.

The primer layer includes a conductive agent and a binder, and improvement in chemical lithiophilicity due to the components constituting the primer layer is insignificant. However, the primer layer exhibits higher lithiophilicity than copper, which is typically used as the material for the negative electrode current collector. Also, in the case in which the primer layer is introduced to the negative electrode current collector, the specific surface area of the negative electrode current collector is increased. Consequently, the size of a physical lithium plating site is increased, whereby it is possible to prevent local formation of lithium dendrites.

In addition, a lithiophilic material is formed on the primer layer by coating, and lithiophilicity is further improved by the lithiophilic material. That is, in the present invention, the primer layer and the lithiophilic material are applied to the negative electrode current collector. Even in the case in which the lithiophilic material is agglutinated and thus the primer layer is partially exposed between the agglutinated lithiophilic materials, therefore, it is possible to further improve the effect of preventing local formation of lithium dendrites than in a negative electrode current collector having no primer layer.

In addition, the force of adhesion at the interface between the negative electrode current collector and the separator may be increased.

The primer layer is not particularly restricted as long as the primer layer is made of a material that exhibits conductivity and lithiophilicity while not deteriorating performance of a lithium secondary battery. For example, the primer layer may include carbon, a conductive polymer, or a mixture thereof. Specifically, the primer layer may include carbon.

The kind of the negative electrode current collector is not particularly restricted, as long as the negative electrode current collector exhibits high conductivity while the negative electrode current collector does not induce any chemical change in a lithium secondary battery. For example, the negative electrode current collector may be made of copper, stainless steel, aluminum, nickel, titanium, or sintered carbon, may be made of copper or stainless steel, the surface of which is treated with carbon, nickel, titanium, or silver, or may be made of an aluminum-cadmium alloy. In addition, the negative electrode current collector may be configured in any of various forms, such as a film, a sheet, a foil, a net, a porous body, a foam body, and a non-woven fabric body, each of which has a micro-scale uneven pattern formed on the surface thereof or each of which has no micro-scale uneven pattern formed on the surface thereof.

Although the thickness of the negative electrode current collector is not particularly restricted, the thickness of the negative electrode current collector is preferably 5 μm to 30 μm, more preferably 10 μm to 20 μm. If the thickness of the negative electrode current collector is greater than 30 μm, the capacity of the electrode per volume may be reduced. If the thickness of the negative electrode current collector is less than 5 μm, a folding phenomenon may occur at the time of manufacture of the electrode.

In the present invention, an electrode active material layer may be optionally included. That is, the negative electrode according to the present invention may be configured such that a lithiophilic material is formed on the primer layer by coating without inclusion of a negative electrode active material layer, or may include a negative electrode current collector having a primer layer coated with a lithiophilic material and an electrode active material layer.

The negative electrode active material may include at least one selected from the group consisting of a carbon material, a lithium alloy, a lithium metal composite oxide, lithium-containing titanium composite oxide (LTO), and a combination thereof. Here, the lithium alloy includes an element capable of being alloyed with lithium, and mention of Si, Sn, C, Pt, Ir, Ni, Cu, Ti, Na, K, Rb, Cs, Fr, Be, Mg, Ca, Sr, Sb, Pb, In, Zn, Ba, Ra, Ge, Al, or an alloy thereof may be made as the element capable of being alloyed with the lithium.

The thickness of the negative electrode active material layer may be 0 μm to 40 μm, specifically 5 μm to 40 μm, more specifically 10 μm to 20 μm.

In the present invention, a method of forming the negative electrode active material layer on the negative electrode current collector is not particularly restricted, and a method known in the art may be used. For example, the negative electrode active material layer may be formed by depositing or coating lithium metal or a lithium alloy on the current collector through a dry or wet process or by laminating a pre-manufactured lithium metal sheet or foil onto the current collector.

The lithiophilic material is located on the primer layer in a state of being dispersed over the primer layer. Alternatively, the lithiophilic material may be agglutinated so as to be disposed in an island shape such that the primer layer is partially exposed.

In a concrete example, the lithiophilic material may be distributed within a range of 5% to 100%, specifically a range of 10% to 90%, more specifically a range of 30% to 80%, of the total area of the negative electrode current collector. In addition, more specifically, the lithiophilic material may be distributed within a range of 50% to 70% of the total area of the negative electrode current collector.

In the case in which the area of the lithiophilic material is less than 5% of the total area of the negative electrode current collector, the distribution area of the lithiophilic material is small, whereby it is difficult to obtain the effect provided by the lithiophilic material, which is undesirable. In the case in which the area of the lithiophilic material is greater than 100% of the total area of the negative electrode current collector, which means introduction of a surplus lithiophilic material, energy density is reduced, which is undesirable.

When considering that lithium plating occurs on the lithiophilic material, it is possible to improve performance of a secondary battery in the case in which the surface of the negative electrode current collector that faces a positive electrode is not coated with the lithiophilic material at the time of manufacture of an electrode assembly. Consequently, the lithiophilic material may be formed on only the first surface of the negative electrode current collector, on which the primer layer is formed, by coating, and the first surface may be disposed as a surface that does not face the separator and the positive electrode in order to manufacture the electrode assembly.

The present invention provides a method of manufacturing the negative electrode for lithium secondary batteries. Specifically, the method of manufacturing the negative electrode for lithium secondary batteries may include a step of preparing a negative electrode current collector, a step of coating the negative electrode current collector with a primer to form a primer layer, and a step of coating the primer layer with a lithiophilic material.

A lithiophilic material coating solution may include a metal salt and a reducing agent. The metal salt may be nitrate and chloride. For example, the metal salt may be at least one selected from the group consisting of $HAuCl_4$, $H_2PtCl_6$, $AgNO_3$, AuCl, $AuCl_3$, $K(AuCl_4)$, $AuBr_3$, $PtCl_2$, $PtCl_4$, AgCl, AgCN, and $CuCl_2$.

The reducing agent may be at least one selected from the group consisting of hydrazine, glucose, ammonia, phosphorous acid, hydrogen peroxide, succinimide, formic acid, and sulfide.

The content of the metal salt in the lithiophilic material coating solution may range from 0.1 weight % to less than 50 weight %, specifically from 5 weight % to 30 weight %.

In the case in which the content of the metal salt is less than 0.1 weight %, processability is deteriorated, since the growth speed of the lithiophilic material is low, and it is difficult to sufficiently obtain a lithiophilicity improvement effect, since the amount of the lithiophilic material is small. In the case in which the content of the metal salt is greater than 50 weight %, on the other hand, it is difficult to control growth of particles forming a lithiophilic material layer, whereby the lithiophilic material layer may be nonuniformly formed, and therefore lithium may nonuniformly grow, which is undesirable.

A lithiophilic material coating method is not particularly restricted. For example, immersing, spin coating, dip coating, spray coating, doctor blade coating, solution casting, drop coating, physical vapor deposition (PVD), or chemical vapor deposition (CVD) may be used.

The present invention provides an electrode assembly including the negative electrode for lithium secondary batteries. The electrode assembly may include a negative electrode configured such that a first primer layer is applied to a first surface of a negative electrode current collector and a second primer layer is applied to a second surface of the negative electrode current collector, wherein a separator is interposed between the negative electrode and a positive electrode.

The positive electrode is manufactured, for example, by applying a positive electrode mixture including a positive electrode active material to a positive electrode current collector and drying the positive electrode mixture. The positive electrode mixture may further optionally include a binder, a conductive agent, and a filler, as needed.

The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or sintered carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material. The positive electrode current collector may be configured in various forms, such as a film, a sheet, a foil, a net, a porous body, a foam body, and a non-woven fabric body.

The positive electrode active material is a material that is capable of inducing an electrochemical reaction. The positive electrode active material may be a lithium transition metal oxide including two or more transition metals. For example, the positive electrode active material may be, but is not limited to, a layered compound, such as a lithium cobalt oxide ($LiCoO_2$) or a lithium nickel oxide ($LiNiO_2$) substituted with one or more transition metals; a lithium manganese oxide substituted with one or more transition metals; a lithium nickel-based oxide represented by the chemical formula $LiNi_{1-y}M_yO_2$ (where M=Co, Mn, Al, Cu, Fe, Mg, B, Cr, Zn, or Ga, at least one of which is included, and $0.01 \leq y \leq 0.7$); a lithium nickel cobalt manganese composite oxide represented by the chemical formula $Li_{1+z}Ni_bMn_cCo_{1-(b+c+d)}M_dO_{(2-e)}A_e$ (where $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si, or Y, and A=F, P, or Cl), such as $Li_{1+z}Ni_{1/3}Co_{1/3}Mn_{1/3}O_2$ or $Li_{1+z}Ni_{0.4}Mn_{0.4}Co_{0.2}O_2$; or olivine-based lithium metal phosphate represented by the chemical formula $Li_{1+x}M_{1-y}W\gamma M'_yPO_{4-z}X_z$ (where M=a transition metal, preferably Fe, Mn, Co, or Ni, M'=Al, Mg, or Ti, X═F, S, or N, $-0.5 \leq x \leq 0.5$, $0 \leq y \leq 0.5$, and $0 \leq z \leq 0.1$).

The conductive agent is generally added so that the conductive agent accounts for 1 weight % to 30 weight % based on the total weight of the mixture including the positive electrode active material. The conductive agent is not particularly restricted, as long as the conductive agent exhibits high conductivity without inducing any chemical change in a battery to which the conductive agent is applied. For example, carbon; graphite, such as natural graphite or artificial graphite; carbon black, such as acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or a conductive materials, such as a polyphenylene derivative, may be used as the conductive agent.

The binder is a component assisting in binding between the active material and the conductive agent and in binding with the current collector. The binder is generally added in an amount of 1 weight % to 30 weight % based on the total weight of the mixture including the positive electrode active material. As examples of the binder, there may be used polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, styrene butadiene rubber, fluoro rubber, and various copolymers.

The filler is an optional component used to inhibit expansion of the electrode. There is no particular limit to the filler, as long as the filler is made of a fibrous material while the filler does not cause chemical changes in a battery to which the filler is applied. As examples of the filler, there may be used olefin-based polymers, such as polyethylene and polypropylene; and fibrous materials, such as glass fiber and carbon fiber.

The electrode assembly according to the present invention includes a separator interposed between the positive electrode and the negative electrode.

A thin insulative film that exhibits high ionic permeability and mechanical strength may be used as the separator. For example, the separator may be a porous substrate made of any one selected from the group consisting of polyethylene, polypropylene, polybutylene, polypentene, polyethylene terephthalate, polybutylene terephthalate, polyester, polyacetal, polyamide, polycarbonate, polyimide, polyetheretherketone, polyethersulfone, polyphenylene oxide, polyphenylene sulfide, and polyethylene naphthalate or a mixture of two or more thereof.

In a concrete example, the electrode assembly according to the present invention may include a negative electrode for lithium secondary batteries configured such that each of the first primer layer and the second primer layer is coated with a lithiophilic material.

That is, in the case in which an electrode assembly configured such that a positive electrode, a separator, a negative electrode, a separator, and a positive electrode are stacked in that order is manufactured, a negative electrode having lithiophilic materials formed on opposite surfaces thereof may be used in order to prevent local formation of lithium dendrites on the opposite surfaces of the negative electrode, which face the positive electrodes.

In another concrete example, the electrode assembly according to the present invention may include a negative electrode for lithium secondary batteries configured such that the first primer layer is coated with a lithiophilic material and the second primer layer is coated with no lithiophilic material, wherein the second primer layer may be disposed so as to face a positive electrode in the state in which a separator is interposed therebetween. Consequently, it is possible to prevent growth of lithium dendrites toward the positive electrode.

Hereinafter, the present invention will be described with reference to the following examples. These examples are provided only for easier understanding of the present invention and should not be construed as limiting the scope of the present invention.

Manufacture of Negative Electrode

Example 1

95 weight % of a carbon conductive agent and 5 weight % of a binder were dispersed in N-methylpyrrolidone (NMP) to manufacture a primer slurry, a copper current collector was coated with the primer slurry, and the primer slurry was dried to form a primer layer having a thickness of 3 μm.

AgCN, KCN, and $H_3PO_2$ were mixed with each other at a ratio of 1:1:2 (weight %) to prepare a metal salt/reducing agent mixture, and purified water and ethanol were mixed with each other at a weight ratio of 1:1 to prepare a solvent. 80 weight % of the solvent and 20 weight % of the metal salt/reducing agent mixture were mixed with each other to prepare a lithiophilic material coating solution. In the case in which ethanol is used as the solvent, it is possible to improve wettability of a current collector, compared to the case in which only purified water is used.

The lithiophilic material coating solution was dropped onto the primer layer, and spin coating was performed at 3,000 rpm for 1 minute to form a coating layer.

The copper current collector having the primer layer and the lithiophilic material coating layer formed thereon was vacuum-dried at 100° C. for 12 hours to manufacture a negative electrode.

An SEM photograph of the negative electrode manufactured according to Example 1 is shown in FIG. 1.

Example 2

A negative electrode was manufactured using the same method as in Example 1 except that 30 weight % of a mixture of AgCN, KCN, and $H_3PO_2$ mixed at a ratio of 1:1:2 (weight %) was used as the lithiophilic material coating solution in Example 1.

An SEM photograph of the negative electrode manufactured according to Example 2 is shown in FIG. 2.

Example 3

A negative electrode was manufactured using the same method as in Example 1 except that 20 weight % of a mixture of HAuCl4 and KCN mixed at a ratio of 1:1 (weight %) was used as the lithiophilic material coating solution instead of a mixture of AgCN, KCN, and $H_3PO_2$ mixed at a ratio of 1:1:2 (weight %) in Example 1.

An SEM photograph of the negative electrode manufactured according to Example 3 is shown in FIG. 3.

Comparative Example 1

A copper current collector, which had no primer layer and no lithiophilic material coating layer formed on the surface thereof and which was not thermally treated, was prepared so as to be used as a negative electrode.

A photograph of the surface of the negative electrode manufactured according to Comparative Example 1 is shown in FIG. 4, and an SEM photograph of the negative electrode is shown in FIG. 5.

Comparative Example 2

A negative electrode was manufactured using the same method as in Example 1 except that no lithiophilic material coating layer was formed on a copper current collector while a primer layer was formed on the copper current collector in Example 1.

An SEM photograph of the negative electrode manufactured according to Comparative Example 2 is shown in FIG. 6.

Comparative Example 3

A negative electrode was manufactured using the same method as in Example 1 except that no primer layer was formed on a copper current collector while a lithiophilic material coating layer was formed on the copper current collector and 50 weight % of a mixture of AgCN, KCN, and $H_3PO_2$ mixed at a ratio of 1:1:2 (weight %) was used in Example 1.

An SEM photograph of the negative electrode manufactured according to Comparative Example 3 is shown in FIG. 7.

Referring to FIGS. 1 and 2, from which the degree of application of the lithiophilic material coating solution based on concentration thereof is comparable, FIG. 1 having lower concentration shows that a small amount of the lithiophilic material is applied to the primer layer, whereas FIG. 2 having higher concentration shows that a large amount of the lithiophilic material is more widely applied to the primer layer.

Short-Circuit Occurrence Experiments

Coin cells were manufactured using the negative electrodes manufactured according to Example 1 to Example 3 and Comparative Example 1 to Comparative Example 3.

In order to manufacture a slurry for positive electrode formation, NCM811, as a positive electrode active material, carbon, as a conductive agent, and polyvinylidene fluoride, as a binder, were mixed with each other in a weight ratio of 95:2:3.

The slurry for positive electrode formation was applied to an aluminum current collector so as to have a thickness of 20 μm using a doctor blade and was then vacuum-dried at 120° C. for 4 hours.

The aluminum current collector having the vacuum-dried slurry for positive electrode formation was rolled using a roll press to manufacture 3 mAh/cm$^2$ of a positive electrode.

In order to manufacture a liquid electrolyte, 1 M of $LiPF_6$, as lithium salt, 0.5 volume % of vinylene carbonate, and 1 volume % of fluoroethylene carbonate were added to a mixture of ethylene carbonate and ethyl methyl carbonate mixed with each other so as to have a volume ratio (volume %) of 3:7.

A coin cell was manufactured using the liquid electrolyte, the positive electrode, and the negative electrode. The number of charges and discharges at which short circuit occurred was measured while the coin cell was charged and discharged under the following conditions. The results are shown in Table 1 below.

Charging condition: constant current (CC)/constant voltage (CV), 4.25 V, 0.5 C, 0.1 C current cut-off Discharging condition: constant current (CC) condition 3V, 0.5 C The number of charges and discharges at which short circuit occurs means a point in time at which voltage is not increased but is maintained uniform or is decreased even though voltage does not reach cut-off voltage while lifespan evaluation is performed under the charging and discharging conditions.

TABLE 1

| | Cycle (Number of charges and discharges) |
|---|---|
| Example 1 | 25 |
| Example 2 | 21 |
| Example 3 | 22 |
| Comparative Example 1 | 3 |
| Comparative Example 2 | 11 |
| Comparative Example 3 | 9 |

Referring to Table 1 above, it can be seen that, when comparing Comparative Example 1 and Comparative Example 2 with each other, the primer layer reduces current density of the negative electrode, whereby short circuit is delayed.

When comparing Comparative Example 2 having only the primer layer and Examples having both the primer layer and the lithiophilic material coating layer, time at which short circuit occurred was lengthened twice or more due to addition of the lithiophilic material coating layer.

The reason for this is that uniform lithium plating occurred due to a plurality of Ag or Au particles, which was the lithiophilic material formed on the primer layer. In the case in which the negative electrode according to the present invention is used, therefore, it is possible to increase lifespan of a battery cell and to improve safety of the battery cell.

On the other hand, it can be seen that, in the case in which Ag is nonuniformly coated in an excessively large shape, as in Comparative Example 3, lithium plating intensively occurs on the nonuniformly coated Ag particles, whereby occurrence of short circuit is accelerated.

Those skilled in the art to which the present invention pertains will appreciate that various applications and modifications are possible within the category of the present invention based on the above description.

INDUSTRIAL APPLICABILITY

As is apparent from the above description, in a negative electrode for lithium secondary batteries including a current collector coated with a primer according to the present invention and a method of manufacturing the same, the entire surface of a negative electrode current collector is coated with a lithiophilic material in a dispersed state, whereby lithium plating may occur over the entire surface of the negative electrode current collector. Consequently, lithium nucleation potential is lowered and a plurality of lithium nuclei may be formed.

In addition, since the lithiophilic material is widely distributed, a rate at which additional plating occurs on a plurality of lithium nuclei widely dispersed may be increased, compared to a rate at which a lithium nucleus grows on a specific region of the surface of the negative electrode current collector in a vertical direction. Consequently, it is possible to prevent local occurrence of lithium plating on the surface of the negative electrode current collector, thus preventing growth of lithium dendrites.

In addition, on the assumption that the surface of a conventional negative electrode current collector coated with no primer is a smooth 2D surface, a primer layer formed on the negative electrode current collector according to the present invention by coating has a 3D surface, since the primer layer includes a conductive agent and a binder. Since the 3D negative electrode current collector according to the present invention has a larger specific surface area than the 2D negative electrode current collector, the area of contact with an electrolytic solution is increased. Since the size of the interface between the electrolytic solution and the negative electrode current collector is increased, as described above, electrons may move over a larger area, whereby rate properties may be improved.

Consequently, it is possible to prevent growth of lithium dendrites toward a positive electrode, thus preventing short circuit, whereby it is possible to improve lifespan characteristics and safety of a lithium secondary battery.

The invention claimed is:

1. A lithium secondary battery comprising a positive electrode, a negative electrode, and a separator, wherein the negative electrode comprises:

a negative electrode current collector;

a primer layer applied to an outer surface of the negative electrode current collector; and a lithiophilic material (LPM) formed on at least a portion of the primer layer by coating, wherein the lithiophilic material comprises at least one of a metal selected from Au, Ag, Pt, Zn, or Mg or a metal oxide selected from CuO, ZnO, CoO, or MnO, the negative electrode current collector comprises a first surface that does not face the separator and a second surface that faces the separator, the primer layer is applied to the first surface and optionally the second surface of the negative electrode current collector, and only the first surface, on which the primer layer is formed, is coated with the lithiophilic material.

2. The lithium secondary battery according to claim 1, wherein the primer layer comprises carbon.

3. The lithium secondary battery according to claim 1, wherein the primer layer comprises a conductive agent and a binder.

4. The lithium secondary battery according to claim 1, wherein the negative electrode current collector has a thickness of 5 μm to 30 μm.

5. The lithium secondary battery according to claim 1, wherein the lithiophilic material is distributed within a range of 5% to 100% of the total area of the negative electrode current collector.

6. A method of manufacturing the lithium secondary battery according to claim 1, the method comprising:

preparing the positive electrode, preparing the negative electrode, comprising:

1) preparing the negative electrode current collector;

2) coating the first surface and optionally the second surface of the negative electrode current collector with a primer to form the primer layer; and 3) coating only the first surface, on which the primer layer of step 2) is formed with a coating solution for the lithiophilic material, and assembling the lithium secondary battery.

7. The method according to claim 6, wherein the coating solution comprises a metal salt and a reducing agent.

8. The method according to claim 6, wherein step 3) is performed by immersing, spin coating, dip coating, spray coating, doctor blade coating, solution casting, drop coating, physical vapor deposition (PVD), or chemical vapor deposition (CVD).

9. The method according to claim 7, wherein a content of the metal salt in the coating solution ranges from 0.1 weight % to less than 50 weight %.

10. The method according to claim 7, wherein the metal salt is at least one selected from the group consisting of $HAuCl_4$, $H_2PtCl_6$, $AgNO_3$, AuCl, $AuCl_3$, $K(AuCl_4)$, $AuBr_3$, $PtCl_2$, $PtCl_4$, AgCl, AgCN, and $CuCl_2$.

11. The method according to claim 7, wherein the reducing agent is at least one selected from the group consisting of hydrazine, glucose, ammonia, phosphorous acid, hydrogen peroxide, succinimide, formic acid, and sulfide.

* * * * *